March 21, 1933.  G. E. ROWE  1,902,142
MANUFACTURE OF HOLLOW GLASSWARE
Original Filed Sept. 3, 1931
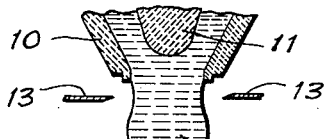
Fig. 1.   Fig. 2.   Fig. 3.
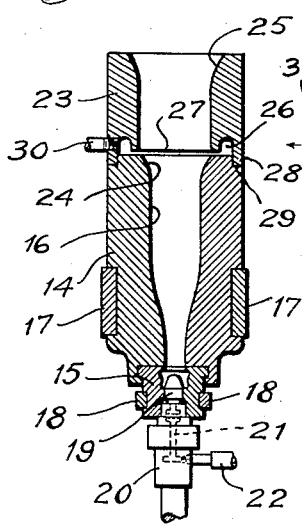 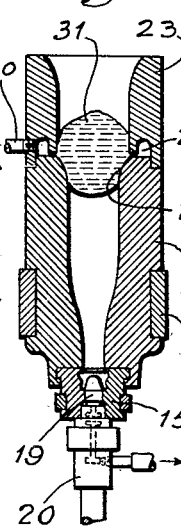 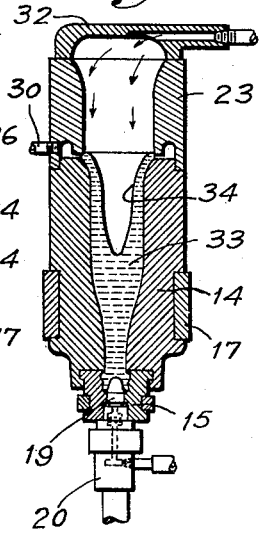
Fig. 4.
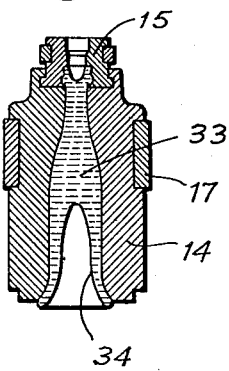
Fig. 5.   Fig. 6.   Fig. 7.
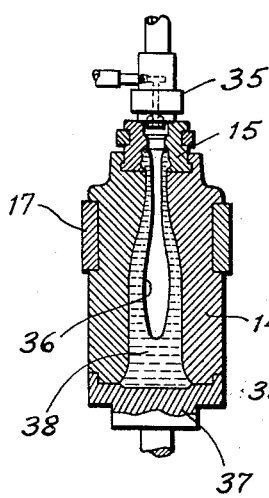 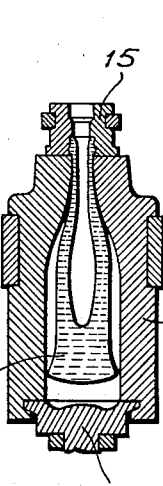 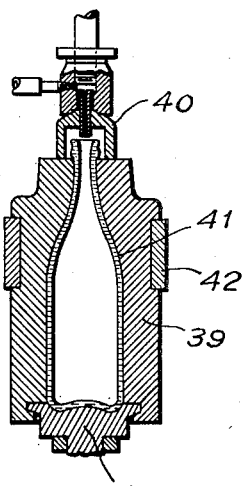
Witness:
W. B. Thayer
Inventor:
George E. Rowe,
by Brown & Parham
Attorneys Patented Mar. 21, 1933

1,902,142

UNITED STATES PATENT OFFICE

GEORGE E. ROWE, OF WETHERSFIELD, CONNECTICUT, ASSIGNOR TO HARTFORD-EMPIRE COMPANY, OF HARTFORD, CONNECTICUT, A CORPORATION OF DELAWARE

MANUFACTURE OF HOLLOW GLASSWARE

Application filed September 3, 1931, Serial No. 560,901. Renewed January 24, 1933.

This invention relates generally to the manufacture of blown glassware, such as bottles and the like, and more particularly to a mode of operation which includes steps of charging a mold with a charge of glass of less mass than the capacity of the cavity of the mold, blowing a bubble in the glass charge in the mold to produce a hollow glass parison, and subsequently blowing the hollow parison to form the article desired.

An object of the invention is to improve manufacture of blown glassware according to the general mode of operation above referred to by providing a method and means whereby a separated mold charge of less length than the cavity of the mold to be charged may be delivered to the open upper end of the mold when the latter is inverted and the descent of glass of the charge into the mold so controlled that the mold cavity will be filled for its full length except for an axial cavity in the glass in the upper portion of the mold cavity and such charging of the mold cavity will be effected without objectionable longitudinal sliding contact with a wall of the mold cavity of any surface portion of the glass therein.

According to the present invention, a separated mold charge having a cross section sufficiently great to effect a seal adjacent the entrance to the mold and of less length than the cavity of the mold to be charged is directed to the upper end of an inverted mold. A peripheral portion of such charge, preferably at the plane of greatest diameter thereof, is restrained against downward movement in the mold cavity from the upper end thereof. The remaining glass of the charge then is forced and/or drawn downwardly in the mold cavity through such restrained peripheral portion thereof so that the entire mold cavity will be filled with glass except for an open-ended axial cavity in the upper portion of the glass in the mold.

The open-ended axial cavity in the glass in the mold subsequently will be eliminated by the forcing back thereinto of an internal portion of such glass when blowing pressure is applied to the neck pin cavity at the initially lower portion of the mold and a baffle or bottom plate has been placed against the initially open upper end of the inverted mold. This will produce a bubble in and expansion of the glass in the mold.

Subsequently, this expanded glass parison may be blown further to form the article desired, this final blowing of the parison preferably being effected in a separate blow mold to which such parison has been transferred.

In my co-pending application, Serial No. 396,243, filed September 30, 1929, I disclose and claim a method of manufacturing hollow glassware which includes the steps of charging an inverted mold with glass of less mass than the mold cavity and controlling the movement of glass in the mold cavity so that the surface of such glass will contact with the walls of the mold cavity throughout the area of the latter and an open-ended axial cavity will be formed in the upper portion of the glass in the mold. In the performance of the method of the aforesaid prior application, Serial No. 396,243, the control of the movement of glass of the charge in the mold cavity is commenced prior to the separation of the mold charge from the source of supply of molten glass from which such charge is obtained.

In my co-pending application, Serial No. 492,664, filed November 1, 1930, I also disclose and claim a method of manufacturing blown glassware, which includes the steps of charging an inverted parison mold with a charge of glass of less mass than the capacity of the mold cavity. The contact of glass of such charge with the walls of the upper portion of the mold cavity and the production of an open-ended axial cavity in the glass in the upper portion of such mold are effected in the performance of such method by projecting a cavity forming plunger downwardly into the glass charge in the mold cavity with consequent upward displacement in the mold cavity of a portion of the glass of the charge.

The present application, therefore, is a continuation in part of my prior copending applications as to features which are common to the present application and such prior applications.

Other objects and advantages of the present invention will become apparent from the following description of a practical embodiment and mode of using the invention, when such description is considered in conjunction with the accompanying drawing.

In the drawing:

Figures 1 to 7, inclusive, are fragmentary vertical sectional views, illustrating certain steps in the applicant's improved method of forming a bottle from a separated charge of molten glass in successively used parison and finishing molds, and showing only such structural parts and appliances as are believed to require illustration in order clearly to point out to those skilled in the art how the invention may be used.

Referring now particularly to the drawing, I show in Fig. 1, an outlet 10 through which molten glass may be discharged under the control of a discharge regulating plunger 11 to produce a suspended mold charge mass, such as indicated at 12. Shear blades 13 may be closed to cut through the suspended mass of glass at a plane spaced below and out of smearing relation with the discharge outlet to produce a separated mold charge, which as shown is of generally spheroidal shape but which may have other forms so long as it has a cross section sufficient to effect the proper seal on entering the upper end of the mold.

Any suitable known feeder construction for providing separated mold charges of regulable shape and size may be employed. If desired, the accumulating suspended mold charge mass may be heated, as by a curtain of flame, as now is well known in the art, in order to provide for desirable conditions of viscosity and temperature in the separated charge and to preclude undesirable chilling of or skin formation on any portion of such charge.

An inverted parison mold may be disposed below and in axial alignment with the feeder outlet. This mold preferably comprises cooperative separable body and neck ring sections 14 and 15, respectively, and may have a downwardly tapering glass shaping cavity, designated generally 16. Both the parison mold body section 14 and the neck ring section 15 may be of the usual two-part construction, and so formed with relation to each other that the halves of the body section 14 may be opened while the neck ring section remains closed.

The halves of the parison mold body section 14 and the halves of the neck ring 15 may be carried by suitable arms, such as indicated at 17 for the body section halves and at 18 for the neck ring halves.

A neck pin 19 is disposed with its tip projecting into the bore of the closed neck ring in position to cooperate with the latter to form an initial blow aperture in the neck portion of the glass therein. This neck pin 19 may be mounted on a carrier 20 so that it may be moved axially to and from position to project into the neck mold. The carrier may be of any suitable known construction.

The neck pin carrier and the neck pin may be provided with a suitable passage, indicated at 21, connected by a tube 22, or other air-tight conduit, with a source of sub-atmospheric pressure or suction, not shown, whereby a partial vacuum may be caused in the space between the tip of the neck pin and the walls of the cavity of the neck ring to aid in drawing glass downwardly thereinto and in forming the neck portion of the glass parison in the parison mold. This mode of applying suction to the space about a neck pin in the neck ring is well known in the art.

The cooperative relation between the neck ring and the body section of the parison mold and between the neck pin and the neck ring, and the method of and means for operating such parts, are well known in the art. Therefore, no means for effecting these operations has been shown in the drawing as any suitable known mechanism may be employed or such parts might even be operated by manual action.

A mold charge guide or funnel for directing a separated charge of glass to the upper end of the cavity of the parison mold is indicated at 23. The cavity of the parison mold preferably is flared at its upper end, as indicated at 24, and the bore of the major portion of the guide 23, or at least the lower end of such bore, preferably has a diameter and a configuration corresponding with the diameter and configuration of the upper end of the flared portion of the cavity of the parison mold. The upper portion of the bore of the guide 23 may be flared or enlarged, as indicated at 25.

The lower end portion of the guide and the upper end portion of the inverted parison mold are so related as to shape and construction as to provide an annular space or chamber 26 therebetween, said space being closed at its outer side to the atmosphere and provided at its inner side with a port 27 establishing communication between the chamber 26 and the upper end of the mold cavity. For example, a downwardly extending flange or apron portion 28 at the outer periphery of the guide may fit into an annular recess 29 in the upper end of the parison body mold at the outer periphery of the latter, leaving the aforesaid annular chamber or space 26 and the port 27 between the adjacent ends of the guide and parison mold. The port 27 in this form of construction is in the form of a narrow slit at the inner periphery of the meeting ends of the guide and parison mold, such slit being too narrow to permit molten glass to be drawn thereinto. It is obvious, however, that such port may comprise a series of spaced small openings. Moreover, the annular chamber and the port may be located in various positions, the essential feature being that the annular space 26 shall be in communication with the interior of the cavity of the inverted parison mold at the open upper end of the latter, so that suction may be applied throughout the inner periphery of the upper end of the parison mold cavity when the space 26 is connected with a source of suction. The connection of the space 26 with a source of suction may be effected in any suitable known manner and by any suitable mechanism, as by means which includes a conduit 30.

In carrying out the invention, the separated mold charge, when severed by the shear blades 13, will drop into the flared upper end of the guide 23 and will be directed by the latter to the flared upper end of the cavity of the closed parison mold. The size of the outlet 10 is selected with relation to the size of the upper end of the cavity of the body mold, so that the separated charge will contact at its place of greatest diameter with the flared upper portion of the mold when the charge is delivered by the guide 23 to the upper end of the body mold. Removable and replaceable outlet rings for glass feeding devices are well known in the art. It therefore will be understood that an outlet ring of suitable size may be employed in the outlet construction of the feeding mechanism.

The separated charge, indicated at 31, is shown in Fig. 2 with its peripheral portion at the plane of its greatest diameter, resting upon and supported by the flared portion 24 of the parison body mold. The purpose of stopping the downward movement of the peripheral portion of the mold charge by a flared upper portion of the mold cavity is to assure controlling action by suction from the space 26 on the glass. If the suction employed is adequate to stop the downward movement of the glass charge at the upper end of the parison mold and to retain the peripheral portion of such charge against the wall of the mold cavity without the upper end of such cavity being flared, then such feature may be omitted.

After the stoppage of descent of the peripheral portion of the mold charge at the upper end of the parison mold, as illustrated in Fig. 2, a blow head 32 may be superimposed on the guide 23 and blowing pressure applied as indicated by the arrows in Fig. 3 to force down the major portion of the glass charge through the supported peripheral portion thereof into the cavity of the parison body mold and the neck mold, thereby producing a glass parison 33 which will extend the full length of the cavity of the parison mold and will contact with the inner walls of such mold cavity throughout the entire area thereof. This parison 33 will have an open-ended axial cavity 34 in its upper portion. The downward movement of the major portion of the glass charge through the supported peripheral portion thereof also may be aided by the application of suction through the passage 21 and around the neck pin 19 to the space within the neck ring and the lower portion of the parison mold body section. The action of the pressure fluid from the blow head 32 will be modified by the viscosity of the glass on which it acts and by the cohesion between the portions thereof and the tendency of the glass to be chilled somewhat and become stiffer on first contact with a wall of the mold so that the charging of the mold will be effected without any harmful longitudinal stretching of the surface of any portion of the glass in the mold cavity, without any appreciable sliding contact of such glass with a wall of the mold cavity and without any lapping or folding of surface portions of the glass in the mold cavity.

After the mold has been charged in the manner described and the open-ended cavity 34 has been formed in the upper portion thereof, the guide 23 and the blow head 32 may be removed. The charged mold may be reverted and the neck pin removed at this time, as shown in Fig. 4. Air pressure then may be applied through the neck ring section of the mold, as by a suitable blow head 35, Fig. 5, to blow a bubble 36 in the glass in the mold and provide a hollow parison, a baffle or bottom plate 37 first having been brought to position to close the open glass receiving end of the parison mold. However, it is to be understood that this expansion of the glass parison may be effected before reversion of the parison mold or during the step of reverting the parison mold.

After the production of the hollow parison 38 illustrated in Fig. 5, the halves of the body section of the parison mold may be opened and removed and the halves of a blow mold 39 closed about the suspended parison, as shown in Fig. 6. A suitable reheating period may be provided while the expanded parison is in the body mold. The neck ring 15 then may be opened and removed and a blow head 40 may be applied to the final blow mold 39, as shown in Fig. 7, and blowing pressure supplied thereby to blow the hollow parison to final form, as indicated at 41 in Fig. 7.

The blow mold may be of the usual two-part construction, the halves thereof being provided with suitable supporting and operating arms 42 and a bottom or baffle plate 43 being provided for cooperation therewith.

The parts which have been described for contact with the glass during the production of a finally blown article of glassware from a separated charge may be supported and operated by any suitable known mechanism, or even may be supported and/or operated by manually operable means.

No mechanisms for supporting and operating and timing the operations of the molds, the blow heads, the neck pin, and the bottom or baffle plates are shown in the drawing since those skilled in the art, having been told the acts to perform, will at once know of apparatus which may be used without changes involving more than mechanical skill should they desire to perform those acts by the use of automatic or semi-automatic machinery. For example, the well-known Lynch glassware forming machine, a disclosure of which may be found in Patent 1,766,135, granted June 24, 1930 to J. W. Lynch, embodies structure which might be used by those skilled in the art without any change or addition beyond the skill of a mechanic for supporting and operating the parts which are shown to carry out the method of the herein described invention. The means for applying suction through the cavity 26 at the upper end of the parison mold and through the neck ring at the lower end of the inverted parison mold should be capable of independent regulation and timing, but suitable timing mechanisms are well known in the art and need not be illustrated herein.

The sequence and character of the steps in forming the desired article of hollow glassware may vary considerably according to different service requirements as may the means for carrying on such steps, without departing from the spirit and scope of the invention. The invention is not to be limited beyond the plain meaning of the terms of the appended claims.

I claim:

1. In the manufacture of hollow glassware, the method of charging a vertically disposed mold having an open upper end, which comprises delivering the charge to the upper end of the cavity of said mold, and checking downward movement of a peripheral portion of said charge at the upper end of the mold cavity while permitting the glass of the remainder of the charge to descend into the mold cavity.

2. In the manufacture of hollow glassware, the method of charging an inverted substantially vertical mold having its cavity formed with a reduced lower end portion, which comprises directing a separated charge of less length than that of the mold cavity downwardly to the upper end of said cavity, restraining a peripheral portion of said charge at its place of greatest diameter against downward movement in the mold cavity from the upper end thereof, and forcing the glass of the remainder of the charge downwardly and into contact with the walls of said cavity throughout the entire length thereof.

3. In the manufacture of hollow glassware, the method of charging a substantially vertical mold having an open upper end and an internally reduced lower portion, comprising the steps of directing a separated charge of molten glass of less mass than the capacity of the mold cavity downwardly to the upper end of said mold cavity, causing a peripheral portion only of said charge to be restrained against downward movement from the upper end of said cavity, blowing the glass of the remainder of the charge downwardly through said restrained portion thereof to fill the mold cavity except for an open axial cavity in the upper portion of the glass in said mold.

4. In the manufacture of hollow glassware, the method of charging a substantially vertical mold having an open upper end and an internally reduced lower portion, comprising the steps of directing to the upper end of the mold cavity a compact separated charge of glass of less mass than the capacity of the mold cavity, restraining a peripheral portion only of said charge against downward movement in the mold cavity from the upper end thereof while permitting the glass of the remainder of the charge to descend in said mold cavity, and establishing differential pressures above and below the glass of said charge to facilitate downward movement of the unrestrained glass of the charge.

5. In the manufacture of hollow glassware, the method of loading an inverted mold having an open upper end and a lower portion adapted to form the neck finish of a bottle or like article, which comprises the steps of directing a compact separated charge of glass downwardly to the open upper end of the mold cavity, checking the descent of a peripheral portion of said charge at the upper end of said mold cavity, applying subatmospheric pressure to said peripheral portion of the charge to restrain it from descending in the mold cavity, blowing glass of the charge downwardly through the restrained portion, and causing a partial vacuum in the lower end portion of the mold cavity, to cause glass of the charge to fill the mold cavity except for an open axial cavity in the upper portion of the glass in the mold.

6. In the manufacture of hollow glassware, the method which comprises directing a separated charge of molten glass of less mass than the capacity of an inverted mold, having its lower portion adapted to form the neck portion of a bottle or like article, to the upper end of the mold cavity, restraining a peripheral portion only of said mold charge against downward movement in the mold cavity, applying blowing pressure from above to the glass to force the unrestrained portion of the charge downwardly into the mold cavity, applying suction from below to the descending glass to facilitate the filling of the mold cavity, except for an open axial cavity in the upper portion of the glass in the mold, applying a baffle to the receiving end of said mold, blowing back an internal portion of the glass in the mold by pressure applied through the neck portion of such glass to eliminate said axial cavity in the glass and to produce a partially expanded parison, and subsequently blowing said partially expanded parison to final form.

7. In glass forming apparatus, the combination with a mold having a body portion and a neck forming portion, and a charge guide for directing a separated charge of glass to the open end of the body portion of said mold when the mold is in inverted position below a charge delivery outlet, said charge guide and the adjacent end of said mold being cooperatively formed to provide an annular passage between the adjacent ends thereof, said annular passage having communication with the interior of the mold cavity around the upper end thereof, and means for applying sub-atmospheric pressure to said annular cavity, the wall of the mold cavity being flared at its upper end at the place of communication between said annular passage and said mold cavity.

8. In the manufacture of hollow glassware, the method of charging a mold having a glass shaping cavity open at one end, which comprises the steps of presenting a separated charge of molten glass at said open end of the mold cavity, checking movement of a peripheral portion of the charge at said open end of the mold cavity, and causing glass of the remainder of the charge to move longitudinally of the mold cavity.

9. In the manufacture of hollow glassware, the method of charging a mold having a glass shaping cavity open at one end, which comprises the steps of bringing to said open end of the mold cavity a separated charge of glass of insufficient mass completely to fill the mold cavity, checking movement of a peripheral portion of the charge at said open end of the mold, and applying a force to the outer end of the glass of said charge to impel the unchecked glass thereof longitudinally of the mold cavity to charge the mold cavity with glass having an axial cavity at its outer end.

10. In the manufacture of hollow glassware, the method of charging a mold having a glass shaping cavity open at one end, which comprises the steps of presenting at said open end of the mold cavity a separated charge of glass of insufficient mass completely to fill said cavity, applying superatmospheric pressure to the outer end of the glass charge and causing subatmospheric pressure on the inner end of said charge to tend to move said charge longitudinally of the mold cavity, and checking movement of a peripheral portion of the charge at the outer end of said mold cavity to effect charging of the mold cavity with glass having an axial cavity at its outer end.

Signed at Hartford, Connecticut, this 12th day of August 1931.

GEORGE E. ROWE.